United States Patent
Inagawa et al.

(10) Patent No.: US 9,132,343 B2
(45) Date of Patent: Sep. 15, 2015

(54) DEVICE FOR PROVIDING A GAME CONTENT

(71) Applicant: DeNA Co., Ltd., Tokyo (JP)

(72) Inventors: Masatoshi Inagawa, Tokyo (JP); Tasuku Suenaga, Tokyo (JP); Takao Kawase, Tokyo (JP); Yoshikazu Oda, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 13/921,930

(22) Filed: Jun. 19, 2013

(65) Prior Publication Data

US 2014/0004937 A1    Jan. 2, 2014

(30) Foreign Application Priority Data

Jun. 27, 2012  (JP) ................................. 2012-144309

(51) Int. Cl.
*A63F 9/24* (2006.01)
*A63F 13/00* (2014.01)
*A63F 13/822* (2014.01)
*A63F 13/53* (2014.01)

(52) U.S. Cl.
CPC ................. *A63F 13/00* (2013.01); *A63F 13/53* (2014.09); *A63F 13/822* (2014.09); *A63F 2300/807* (2013.01)

(58) Field of Classification Search
CPC ................ A63F 2001/0475; A63F 2001/0483; A63F 2300/609; A63F 2300/206; A63F 13/53; A63F 13/822
USPC ......................................................... 462/29
See application file for complete search history.

(56) References Cited

U.S. PATENT DOCUMENTS

| | | | |
|---|---|---|---|
| 2005/0250565 A1 | 11/2005 | Nojiri et al. | 463/8 |
| 2007/0022389 A1* | 1/2007 | Ording et al. | 715/790 |
| 2010/0095326 A1* | 4/2010 | Robertson, III | 725/40 |

FOREIGN PATENT DOCUMENTS

| | | |
|---|---|---|
| JP | 2002042233 | 2/2002 |
| JP | 2002/282534 | 10/2002 |

(Continued)

OTHER PUBLICATIONS

Magic the Gathering Online. Manual. Accessed via the Internet. Accessed Apr. 5, 2014. <URL: http://www.wizards.com/magic/rules/en_mol_manual.pdf>.*

(Continued)

*Primary Examiner* — Dmitry Suhol
*Assistant Examiner* — Carl V Larsen
(74) *Attorney, Agent, or Firm* — Pillsbury Winthrop Shaw Pittman LLP

(57) ABSTRACT

One object is to provide a server device that permits players to enjoy provided game contents more effectively. In accordance with one aspect, the server device according to an embodiment includes: a selection unit configured to select, from game contents, a plurality of provided game contents to be provided to a player; an identification unit configured to identify one or more specific game contents satisfying a specific condition and identify one or more normal game contents not satisfying the specific condition, among the plurality of provided game contents; and a display control unit configured to display the one or more specific game contents in a larger size than the one or more normal game contents on a terminal device of the player.

6 Claims, 17 Drawing Sheets

(56) References Cited

FOREIGN PATENT DOCUMENTS

JP    2005/319025    11/2005
JP    2008/161479    7/2008

OTHER PUBLICATIONS

Internet Archive webpage. Online. Accessed via the Internet. Accessed Apr. 5, 2014. <URL: https://web.archive.org/web/20040415000000*/http://www.wizards.com/magic/rules/en_mol_manual.pdf>.*

"Dragon Collection", *FamitsuGree*, Japan, Enterbrain, Inc., Sep. 8, 2011, special appendix to Weekly Famitsu Sep. 22 issue, pp. 16-17.

"Monhun Card Master with Everone", *AppliFan*, Japan, Cosmic Publishing, Apr. 15, 2012, vol. 2, pp. 194-195.

Japanese Office Action of Japanese Patent Application No. 2012-144309 dated Oct. 18, 2012.

* cited by examiner

Player Management Table

| Player Name | Player Identification Information |
|---|---|
| P1 | P001 |
| P2 | P002 |
| P3 | P003 |
| P4 | P004 |
| P5 | P005 |
| ... | ... |

Fig. 4

Card Management Table

| Player Name | Player Identification Information | Card C1 (C001) | Card C2 (C002) | ... |
|---|---|---|---|---|
| P1 | P001 | XP001C001A001<br>P001C001A002<br>P001C001A003 | P001C002A001 | ... |
| P2 | P002 | 00000000 | P001C002A001<br>P001C002A002 | ... |
| P3 | P003 | 00000000 | P003C002A001<br>P003C002A002 | ... |
| P4 | P004 | X00000010 | 00000000 | ... |
| ... | ... | ... | ... | ... |

Fig. 5

Characteristic Value Management Table

| Card Identification Information | Name | Level | Offensive Value | Physical Strength Value | Rarity Value | |
|---|---|---|---|---|---|---|
| P001C001A001 | Soldier A | 5 | 10 | 20 | Uncommon | ... |
| P001C001A002 | Soldier A | 3 | 20 | 15 | Common | ... |
| P001C001A003 | Soldier A | 15 | 115 | 50 | Rare | ... |
| ... | ... | ... | ... | ... | ... | ... |
| P001C002A001 | Soldier B | 1 | 10 | 20 | Common | ... |
| P001C002A002 | Soldier B | 5 | 2 | 15 | Rare | |
| ... | ... | ... | ... | ... | ... | ... |
| P002C001A001 | Soldier A | 22 | 90 | 80 | Uncommon | |
| ... | ... | ... | ... | ... | ... | ... |
| P002C052A001 | Playboy | 1 | 1500 | 20 | Super Rare | |
| ... | ... | ... | ... | ... | ... | ... |
| P003C001A001 | Soldier A | 1 | 2 | 5 | Uncommon | |
| ... | ... | ... | ... | ... | ... | ... |

Fig. 6

Provided Card Management Table

| Card Identification Information | Name | Level | Offensive Value | Physical Strength Value | Rarity Value | ... |
|---|---|---|---|---|---|---|
| P001C001A005 | Soldier A | 1 | 10 | 10 | Common | ... |
| P001C002A003 | Soldier B | 3 | 20 | 15 | Common | ... |
| P001C003A004 | Soldier C | 4 | ... | ... | ... | ... |
| ... | ... | ... | ... | ... | ... | ... |
| P001C020A001 | Wizard A | 5 | 202 | 15 | Rare | |
| ... | ... | ... | ... | ... | ... | ... |
| P001C052A001 | Playboy | 1 | 555 | 10 | Super Rare | |
| ... | ... | ... | ... | ... | ... | ... |

Fig. 7

Sequential Gasha

You drew six cards below.

Name: Soldier A
Level: 5   Offensive value: 15
Physical strength value: 10
Rarity value: Common [Normal Card]

Name: Soldier C
Level: 2   Offensive value: 5
Physical strength value: 3
Rarity value: Common [Specific Card]

Name: Wizard E
Level: 2   Offensive value:   5
Physical strength value: 3
Rarity value: Uncommon [Normal Card]

Back

Sequential Gasha

You drew six cards below.

Name: Playboy F
Level: 10   Offensive value: 150
Physical strength value: 22
Rarity value: Super Rare [Specific Card]

Name: Dragon G
Level: 2   Offensive value: 20
Physical strength value: 13
Rarity value: Rare [Normal Card]

Name: Alien B
Level: 5   Offensive value: 15
Physical strength value: 30
Rarity value: Uncommon [Specific Card]

Back

DEVICE FOR PROVIDING A GAME CONTENT

CROSS-REFERENCE TO RELATED APPLICATIONS

This application is based on and claims the benefit of priority from Japanese Patent Application Serial No. 2012-144309 (filed on Jun. 27, 2012), the contents of which are hereby incorporated by reference in their entirety.

TECHNICAL FIELD

The present invention relates to a device for providing a video game content.

BACKGROUND

Japanese Patent Application Publication 2002-42233 discloses a system for providing a purchaser with a game content randomly selected from game contents such as trading cards. In the system disclosed in this literature, a purchaser enters a coin into a content-purchasing terminal; and the content-purchasing terminal displays a screen wherein a plurality of game contents are shuffled and provides the purchaser with a game content randomly selected.

Recently, so-called online games are actively provided, wherein terminal devices owned by players receive game data from a server device via a network and perform the game by using the game data. In such online games, terminal devices of players are provided with game contents randomly selected from a plurality of game contents. Online games are providing players with game contents containing more sophisticated pictorial patterns. One of the needs is to permit players to enjoy such sophisticated game contents more effectively.

SUMMARY

To satisfy such a need, various embodiments of the present invention provide a server device that permits players to enjoy provided game contents more effectively.

A server device according to one aspect of the present invention comprises: a selection unit configured to select, from game contents, a plurality of provided game contents to be provided to a player; an identification unit configured to identify one or more specific game contents satisfying a specific condition and identify one or more normal game contents not satisfying the specific condition, among the plurality of provided game contents; and a display control unit configured to display, on a terminal device of the player, a second screen at a higher priority than a first screen, the first screen displaying provided game contents including at least the one or more normal game contents among the plurality of provided game contents, the provided game contents being displayed in a first size, and the second screen being different from the first screen and including a specific display area for displaying the one or more specific game contents among the plurality of provided game contents, the one or more specific game contents being displayed in a second size larger than the first size.

A method using a computer according to one aspect of the present invention comprises the steps of: selecting, from game contents, a plurality of provided game contents to be provided to a player; identifying one or more specific game contents satisfying a specific condition and identifying one or more normal game contents not satisfying the specific con-dition, among the plurality of provided game contents; and displaying, on a terminal device of the player, a second screen at a higher priority than a first screen, the first screen displaying provided game contents including at least the one or more normal game contents among the plurality of provided game contents, the provided game contents being displayed in a first size, and the second screen being different from the first screen and including a specific display area for displaying the one or more specific game contents among the plurality of provided game contents, the one or more specific game contents being displayed in a second size larger than the first size.

Various embodiments of the present invention provide a server device that permits players to enjoy provided game contents more effectively.

BRIEF DESCRIPTION OF THE DRAWINGS

FIG. 4 shows an example of a player management table used by the server device 10 according to an embodiment of the present invention.

FIG. 5 shows an example of a card management table used by the server device 10 according to an embodiment of the present invention.

FIG. 6 shows an example of a characteristic value management table used by the server device 10 according to an embodiment of the present invention.

FIG. 7 shows an example of a provided card management table used by the server device 10 according to an embodiment of the present invention.

DESCRIPTION OF EXAMPLE EMBODIMENTS

Figure 1:
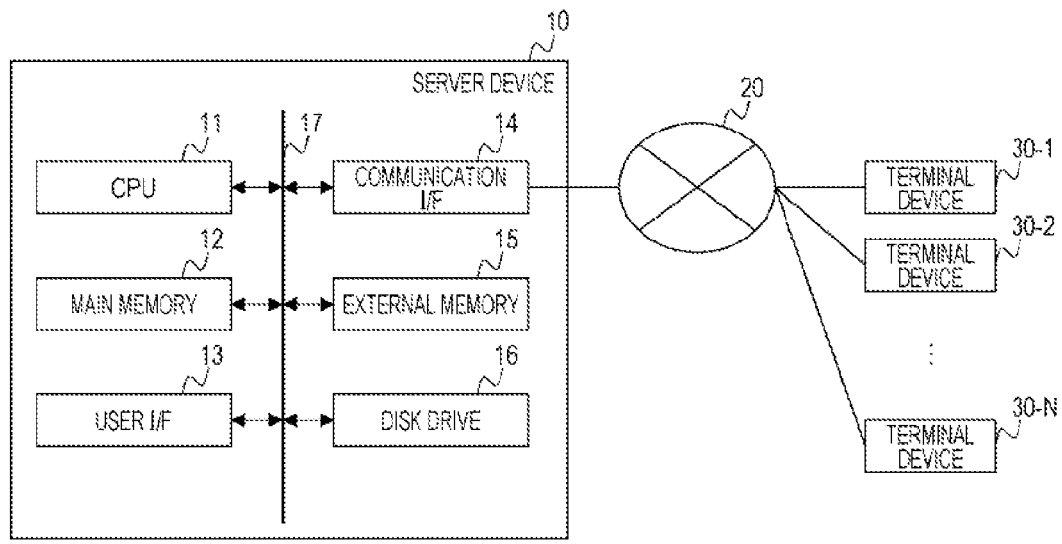
FIG. 1 is a block diagram schematically illustrating a game system according to an embodiment of the present invention.

Various embodiments of the present invention will be described hereinafter with reference to the appended drawings. In the drawings, the same components are denoted by the same reference numerals.

Various embodiments are described below based on the case where a game provided to players from a server device is a so-called "gasha" or "gacha" (hereinafter referred to as "gasha game" for convenience), wherein a player is provided with a game content (e.g., a card) randomly selected from a plurality of game contents in response to a request from the player.

FIG. 1 is a block diagram schematically illustrating a game system according to an embodiment of the present invention. As illustrated in FIG. 1, in the embodiment of the present invention, an online game server device 10 (hereinafter also referred to simply as the "server device 10") may be communicatively connected to a plurality of terminal devices 30-1, 30-2, . . . , and 30-N (hereinafter also collectively referred to as the "terminal devices 30"), each having a communication function, via a communication network 20 such as the Internet. The server device 10 is an example of a device implementing part or all of a game system according to an embodiment of the present invention.

As illustrated in FIG. 1, the server device 10 may include a central processing unit (CPU) 11, a main memory 12, a user interface (I/F) 13, a communication I/F 14, an external memory 15, and a disk drive 16, and these components may be electrically connected to one another via a bus 17. The CPU 11 may load an operating system and various programs for controlling the progress of an online game into the main memory 12 from the external memory 15, and may execute commands included in the loaded programs. The main memory 12 may be used to store a program to be executed by the CPU 11, and may be formed of, for example, a dynamic random access memory (DRAM).

The user I/F 13 may include, for example, an information input device such as a keyboard or a mouse for accepting an input from an operator, and an information output device such as a liquid crystal display for outputting calculation results of the CPU 11. The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the terminal device 30 via the communication network 20.

The external memory 15 may be formed of, for example, a magnetic disk drive and store various programs such as a control program for controlling the progress of an online game. The external memory 15 may also store various data used in the game. The external memory 15 may store, for example, a player management table, a card management table, a characteristic value management table, and a provided card management table; and these tables, described later, store various data in accordance with the progression of the game. Also, these tables may be stored on a database server communicatably connected to the server device 10 and physically separate from the server device 10.

The disk drive 16 may read data stored in a storage medium such as a compact disc read only memory (CD-ROM), digital versatile disc read only memory (DVD-ROM), or DVD Recordable (DVD-R) disc, or writes data to such a storage medium. For example, a game application and data such as game data stored in a storage medium may be read by the disk drive 16, and may be installed into the external memory 15.

In an embodiment, the server device 10 may be a web server for managing a web site including a plurality of hierarchical web pages and may be capable of providing the terminal devices 30 with game services. The terminal devices 30 may be provided with browser software that fetches and analyzes HTML data for rendering a web page to present the web page to a user (a player of the game) of the terminal devices 30. A game provided through a web page rendered by such browser software is sometimes called a browser game. The HTML data for rendering the web page may also be stored on the external memory 15. HTML data may comprise HTML documents written in markup languages such as HTML; the HTML documents can be associated with various images by using tags. Additionally, the HTML documents can include programs written in script languages such as ActionScript™ and JavaScript™.

The external memory 15 may store game applications to be executed on execution environments of the terminal device 30 other than browser software. This game application may include game programs for performing a game and various data such as image data to be referred to for executing the game programs. The game programs are created in, for example, object oriented languages such as Objective-C™ and Java™. The created game programs may be stored on the external memory 15 in the form of application software along with various data. The application software stored on the external memory 15 may be delivered to a terminal device 30 in response to a delivery request. The application software delivered from the server device 10 may be received by the terminal device 30 through a communication I/F 34 in accordance with the control of CPU 31; the received game programs may be sent to an external memory 35 and stored thereon. The application software may be launched in accordance with the player's operation on the terminal device 30 and may be executed on a platform implemented on the terminal device 30 such as NgCore™ or Android™. The server device 10 may provide the game applications executed on the terminal devices 30 with various data required for progression of the games. Additionally, the server device 10 can store various data sent from the terminal device 30 for each player, thereby managing the progression of the game for each player.

Thus, the server device 10 may manage the web site for providing game services and deliver web pages constituting the web site in response to a request from the terminal device 30, thereby progressing the game. Also, the server device 10 can progress a game by communicating various data to and from a game application performed on the terminal device 30 in place of, or in addition to, such a browser game. Whichever mode may be taken to provide the game, the server device 10 can store data required to progress the game for each identification identifying a player (described later). The games provided by the server device 10 may include any games such as gasha games, action games, roll playing games, interactive baseball games, and card games. The types of the games implemented by the web site or game applications of the server device 10 are not limited to those explicitly described herein.

In an embodiment, the terminal device 30 may be a desired information processing device capable of rendering, on a web browser, web pages of a game web site fetched from the server device 10; for example, the terminal device 30 may be a mobile phone, smart phone, game console, personal computer, touch pad, or electronic book reader, but is not limited thereto. In another embodiment, the terminal device 30 may be a desired information processing device including an application execution environment for executing a game application.

Figure 2:
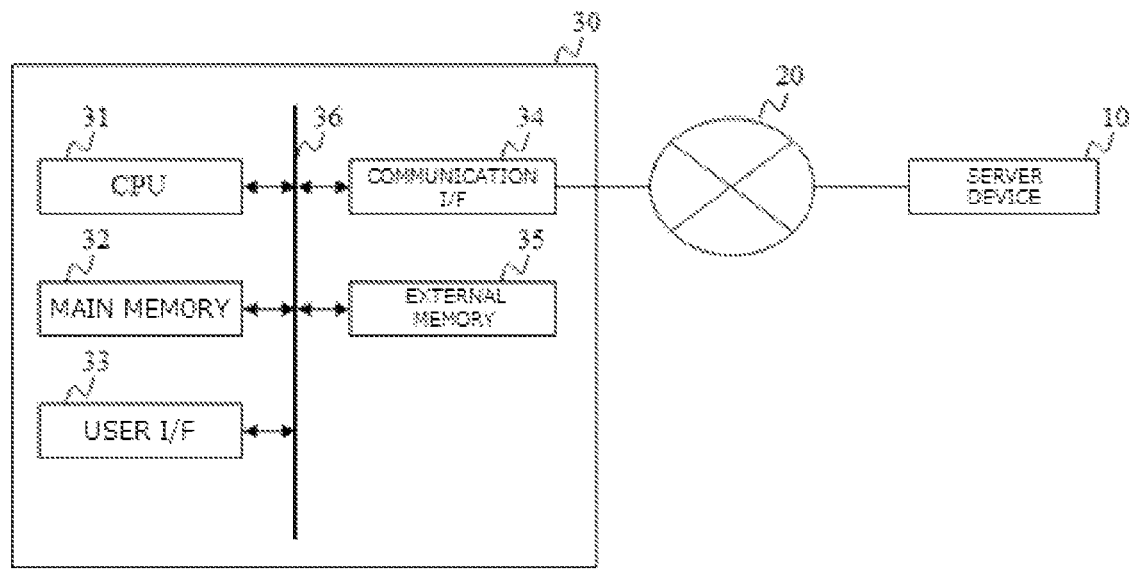
FIG. 2 is a block diagram schematically illustrating the architecture of a terminal device 30.

The architecture of the terminal device 30 will be described with reference to FIG. 2. FIG. 2 is a block diagram schematically illustrating the architecture of a terminal device 30. As illustrated in FIG. 2, the terminal device 30 may include a central processing unit (CPU) 31, a main memory 32, a user interface (I/F) 33, a communication I/F 34, and an external memory 35, and these components may be electrically connected to one another via a bus 36.

The CPU 31 may load various programs such as an operating system into the main memory 32 from the external memory 35, and may execute commands included in the loaded programs. The main memory 32 may store a program to be executed by the CPU 31, and may be formed of, for example, a dynamic random access memory (DRAM).

The user I/F 33 may include, for example, an information input device such as a touch panel, a keyboard, a button, and a mouse for accepting an input from a player (user), and an information output device such as a liquid crystal display for outputting calculation results of the CPU 31. The communication I/F 34 is implemented as hardware, firmware, or communication software such as a transmission control protocol/Internet protocol (TCP/IP) driver or a point-to-point protocol (PPP) driver, or a combination thereof, and is configured to be able to communicate with the server device 10 via the communication network 20.

The external memory 35 may comprise, for example, a magnetic disk drive or a flash memory and store various programs such as an operating system. When receiving a game application from the server device 10 via the communication I/F 34, the external memory 35 may store the received game application.

A terminal device 30 having such an architecture may include browser software for interpreting and rendering an HTML file (HTML data) for example; this browser software may enable the terminal device 30 to interpret the HTML data fetched from the server device 10 and render web pages corresponding to the received HTML data. Further, the terminal device 30 may include plug-in software (e.g., Flash Player distributed by Adobe Systems Incorporated) (FLASH is a trademark) embedded into browser software; therefore, the terminal device 30 can fetch from the server device 10 a SWF file embedded in HTML data and execute the SWF file by using the browser software and the plug-in software.

When a game is executed, for example, animation or an operation icon designated by the program may be displayed on a screen of the terminal device 30. The player may enter an instruction for causing the game to progress using an input interface (e.g., a touch screen or a button) of the terminal device 30. The instruction entered by the player may be transmitted to the server device 10 through the browser of the terminal device 30 or a platform function such as NgCore™.

Figure 3:
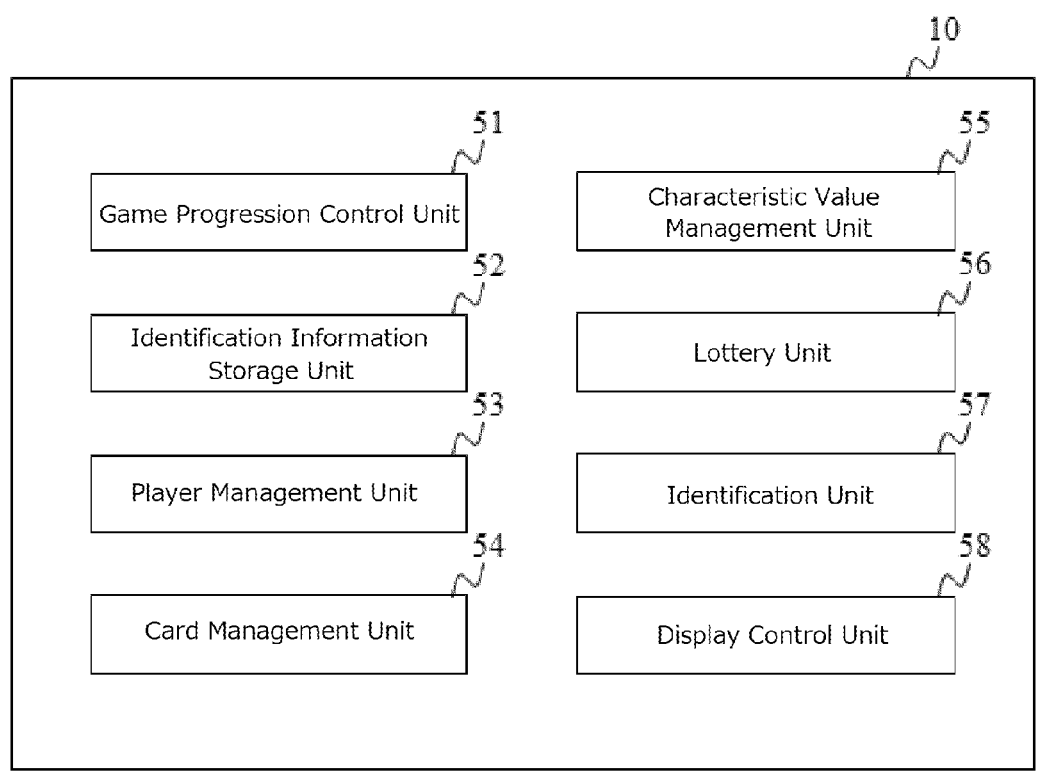
FIG. 3 is a block diagram illustrating the functionality of a server device 10 according to an embodiment of the present invention.

Next, the functionality of the server device 10 implemented by the components shown in FIG. 1 will be described with reference to FIG. 3. FIG. 3 is a block diagram illustrating the functionality of a server device 10 according to an embodiment of the present invention. As shown in FIG. 3, the server device 10 according to the embodiment may comprise a game progression control unit 51, an identification information storage unit 52, a player management unit 53, a card management unit 54, a characteristic value management unit 55, a lottery (selection) unit 56, an identification unit 57, and a display control unit 58. These functions may be implemented by the CPU 11 controlling the loading of a certain program onto a main memory 12 and performing operations based on the instructions in the program.

The game progression control unit 51 may send and receive various data required for the progression of the game to and from the terminal device 30 and manage such data for each player, thereby controlling the progression of the game for each player. For example, the game progression control unit 51 can sequentially display, on the terminal device 30, web pages constituting a web site for providing game services in response to a request from the terminal device 30. When a hyperlink on the displayed web page is selected by the player, the game progression control unit 51 may send new HTML data corresponding to the hyperlink to the terminal device 30. The terminal device 30 displays a web page based on the new HTML data. Thus, the game progression control unit 51 may control the game such that web pages stored on the server device 10 are sequentially provided to the terminal device 30 in accordance with the operation by the player; and the player can progress the game by operating the terminal device 30.

When the terminal device 30 executes the game application, the game progression control unit 51 can send various data used in the game to the game application. For example, when receiving from a game application on the terminal device 30 a control signal indicating that a certain mission has been fulfilled, the game progression control unit 51 may provide the game application with various parameters related to a mission subsequent to the fulfilled mission. The game application may load the data provided by the server device 10 and progress the game.

The terminal device 30 can appropriately send to the server device 10 various information on progression of the game such as information indicating various parameter values used in the game (information on earned game points and earned items) and information indicating a status (information specifying a fulfilled mission), through the function of browser software or the game application. The game progression control unit 51 may store, for each player, information on the progression of the game received from a plurality of terminal devices 30, thereby controlling the progression of the game for each player. Thus, when the player logs in the server device 10 using his own ID, the game may be resumed from the scene corresponding to the progression of the player (e.g., the scene where the game was interrupted) based on the information on the progression of the game associated with the player stored in the server device 10.

Various games are performed on the terminal device 30. The games performed on the terminal device 30 may use various game contents such as electronic cards, items, and virtual currency used in the games. The term "game contents" collectively refers to electronic data used by players to progress the games and including, for example, cards, items, characters, and avatars. In an embodiment of the present invention, the game contents may be obtained, owned, used, managed, exchanged, fused, reinforced, sold, discarded, and/or presented by players in the games in accordance with progression of the games; and the use of the game contents is not limited to those explicitly described herein. In selling of a card in a game, a player may be paid in virtual currency used in the game, not in real currency, for the card sold. The game contents may have, for example, characteristic values assigned thereto (e.g., "rarity value," "level," "offensive value," "physical strength value," and "the name of the game content") to be referred to in the progression of the game as required. At least part of these characteristic values may be updated in accordance with progression of the game. A player can progress the game using the game contents having updated characteristic values. For example, in the card game, a player can use one or more his own cards to fulfill a mission or combat other players or enemy characters (characters operated by the computer), thereby progressing the game. The Applicant provides various card games on Mobage™ platform.

The identification information storage unit 52 stores various information managed by the player management unit 53, the card management unit 54, the characteristic value management unit 55, and the lottery unit 56.

The player management unit 53 may manage a plurality of players to be provided with a game from the server device 10. More specifically, the player management unit 53 may generate a management table (player management table) as shown in, e.g., FIG. 4, and the management table may be stored in the identification information storage unit 52. As shown in FIG. 4, the player management unit 53 may assign each player (e.g., player P1) player identification information (e.g., P001) identifying the player; the player identification information may be stored in the identification information storage unit 52.

The card management unit 54 may manage which cards are owned by players. More specifically, the card management unit 54 may generate a management table (card management table) as shown in, e.g., FIG. 5, and the management table may be stored in the identification information storage unit 52. As shown in FIG. 5, the card management unit 54 may assign each player (e.g., player P1) card identification information identifying a card owned by the player; the card identification information may be stored in the identification information storage unit 52. FIG. 5 shows that, with respect to a same type of card (e.g., card C1 corresponding to soldier A), player P1 is assigned card identification information of three cards, XP001C001A001, P001C001A002, P001C001A003; players P2 and P3, who have never owned the card before, are assigned card identification information 00000000; and player P4, who has once owned the card but currently does not own the card (due to transfer to another player or discard), is assigned card identification information X00000010. Card identification information starting with "X" may identify a card obtained by a player through a gasha game. This card management table may identify the cards currently owned by a player and the cards once owned by the player among cards usable in a game. Further, the card management table may identify whether or not the cards currently owned by a player and the cards once owned by the player were obtained through a gasha game.

The characteristic value management unit 55 may manage characteristic values assigned to cards owned by all the players. More specifically, the characteristic value management unit 55 may generate a management table (characteristic value management table) as shown in, e.g., FIG. 6, and the management table may be stored in the identification information storage unit 52. As shown in FIG. 6, the characteristic value management unit 55 may assign a plurality of characteristic values to each card, and the plurality of characteristic values may be stored in the identification information storage unit 52. FIG. 6 shows examples of characteristic values: name, level, offensive value, physical strength value, and rarity value. This characteristic value management table may identify how characteristic values of each card are currently set.

The lottery (selection) unit 56 may randomly select, for each player, a card (a provided card) to be provided to the player from a plurality of cards. By way of an example, the lottery (selection) unit 56 in the embodiment may randomly select, for each player, a plurality of cards (provided cards) to be provided to the player from a plurality of cards. Such a game that allows a player to sequentially select a plurality of cards in one gasha may be called "a sequential gasha."

Also, the lottery unit 56 at least temporarily manages provided cards selected for each player. More specifically, the card management unit 54 may generate a management table (provided card management table) as shown in, e.g., FIG. 7, and the management table may be stored in the identification information storage unit 52. As shown in FIG. 7, the lottery unit 56 may assign each player (e.g., player P1) card identification information identifying a provided card to be provided to the player and characteristic values assigned to the provided card; the card identification information and the characteristic values may be stored in the identification information storage unit 52. FIG. 7 only shows information regarding player P1 by way of an example, but this table may likewise store information regarding other players.

The identification unit 57 may identify, for each player, cards satisfying a specific condition as "specific cards" and cards not satisfying the specific condition as "normal cards" among provided cards selected by the lottery unit 56. The specific condition may be various; such examples include a first condition that the provided card is not owned or has never been owned by the player, a second condition that the provided card has a designated characteristic value [e.g., i) a card having a rarity value of rare or super rare among rarity values of common, uncommon, rare, and super rare, ii) a card having an offensive value of 10 or higher, and iii) a card with a name "soldier"], or a third condition that the provided card has not been obtained by the player through a gasha game.

When the first condition is applied as a specific condition, the identification unit 57 searches the card management table shown in FIG. 5 with search keys of identification information of the provided card (e.g., C001) and identification information of the player (e.g., P001); and the identification unit 57 identifies whether the player currently owns the provided card (e.g., C001), whether the player once owned the card but currently does not own the card, or whether the player has never owned the provided card. Thus, the identification unit 57 identifies cards satisfying the first condition as specific cards and cards not satisfying the first condition as normal cards among the provided cards.

When the second condition is applied as a specific condition, the identification unit 57 searches the provided card management table shown in FIG. 7 with search keys of identification information of the provided card (e.g., C001) and identification information of the player (e.g., P001); and the identification unit 57 identifies whether or not the provided card (e.g., C001) has a designated characteristic value. Thus, the identification unit 57 identifies cards satisfying the second condition as specific cards and cards not satisfying the second condition as normal cards among the provided cards. The characteristic value in the second condition may be either designated by the server device 10 or designated by the player via the terminal device 30.

Further, when the third condition is applied as a specific condition, the identification unit 57 searches the card management table shown in FIG. 5 with search keys of identification information of the provided card (e.g., C001) and identification information of the player (e.g., P001); and the identification unit 57 identifies whether or not the provided card (e.g., C001) was obtained by the player through a gasha game (whether or not the identification information of the provided card starts with "X"). Thus, the identification unit 57 identifies cards satisfying the third condition as specific cards and cards not satisfying the third condition as normal cards among the provided cards.

The identification unit 57 may apply at least one (or all) of any specific conditions including the first to third conditions described as examples, so as to identify specific cards and normal cards among the provided cards.

The display control unit 58 generates, for each player, a web page composed of HTML data (and web programs such as JavaScript embedded therein) associated with image data representing provided cards selected by the lottery unit 56, that is, image data representing each of the specific cards and the normal cards identified by the identification unit 57; and the display control unit 58 sends the generated web page to the terminal device 30 of the player, the terminal device 30 then displaying on its display the provided cards, that is, the specific cards and the normal cards. In other words, the display control unit 58 controls, for each player, the display mode of the specific cards and the normal cards displayed on the display of the terminal device 30 via the web page composed of HTML data (and web programs such as JavaScript embedded therein) to be sent to the terminal device 30 of the player.

Figure 8:
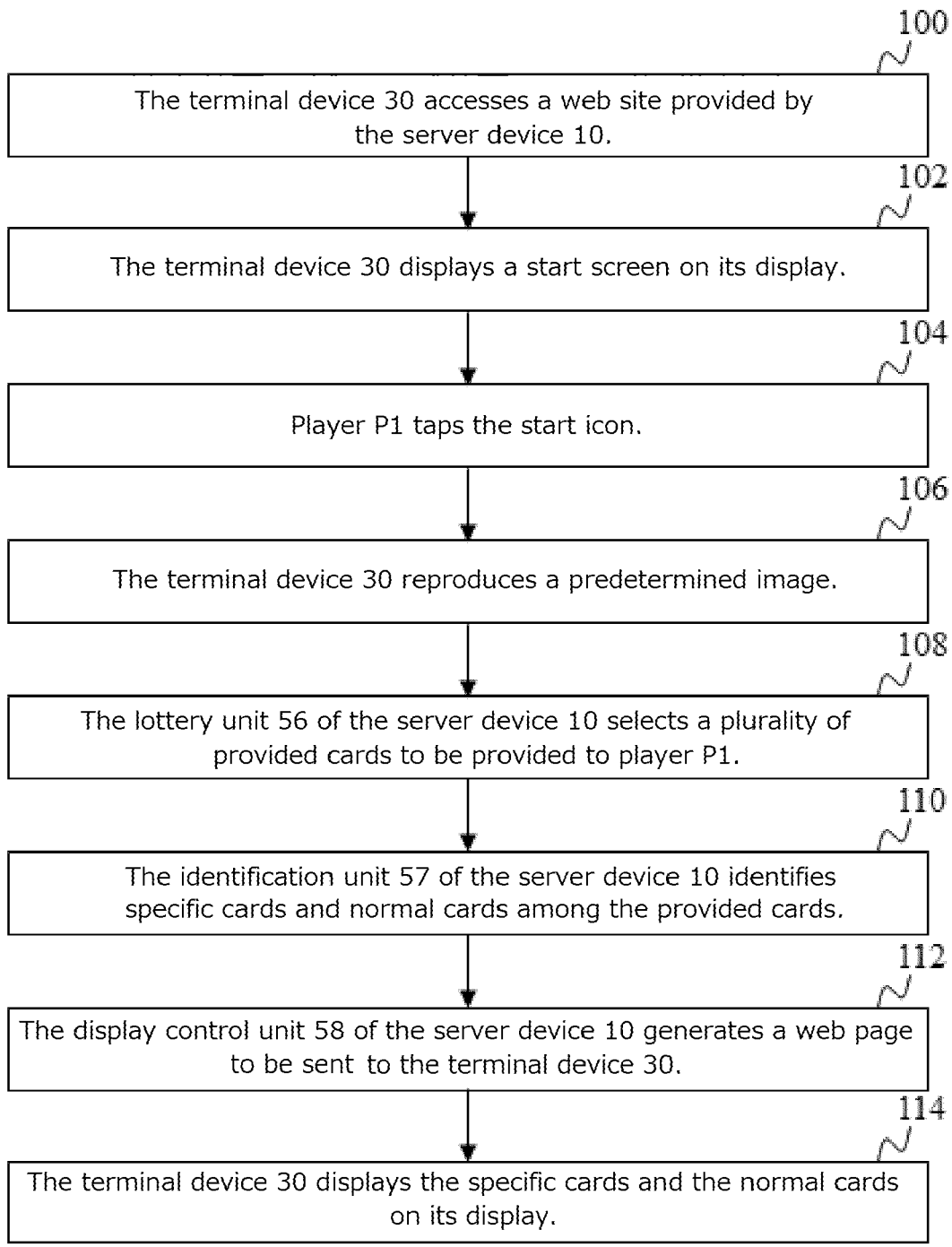
FIG. 8 shows a concrete example of operation performed in a game system according to an embodiment of the present invention.

Next, reference is made to FIG. 8 to describe the operation performed in the server device 10 and the terminal device 30 of the player when the server device 10 provides a gasha game to the terminal device 30 of the player.

FIG. 8 is a flow diagram showing a concrete example of operation performed in a game system according to an embodiment of the present invention.

First, in step 100, the terminal device 30 of the player (e.g., player P1) may access a web site for playing a gasha game provided by the server device 10. On this web site, the terminal device 30 of player P1 submits the identification information (user ID) and password of player P1; and the server device 10 can identify player P1 by using the received identification information. The game site may provide various games including gasha games. Examples of such games are mission games, battle games, and card fusion games.

Meanwhile, if the game is implemented by a game application, the terminal device 30 of player P1 may access the server device 10 and send identification information of player P1. Then, the terminal device 30 displays a game screen that permits selection of various games including gasha games.

Figure 9:
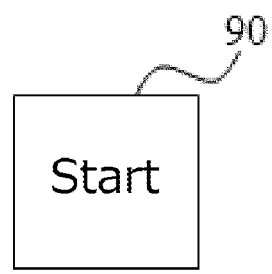
FIG. 9 shows a concrete example of a screen displayed on the terminal device 30 according to an embodiment of the present invention.
Figure 9:
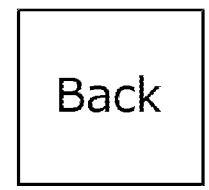

In step 102, once player P1 selects a gasha game, a screen (FIG. 9) that prompts the player to start a sequential gasha is displayed on the display of the terminal device 30 of player P1. In step 104, player P1 taps a starting icon 90 (this operation may be generally referred to as "turning a gasha"); and in step 106, the terminal device 30 of player P1 reproduces an image representing that, for example, a card to be provided to player P1 is selected from a large number of cards. Such an image may be reproduced by, for example, Flash Player (Flash is a trademark) embedded in the browser software.

In step 108, which is performed subsequently to or concurrently with step 106, the lottery unit 56 of the server device 10 may randomly select a plurality of provided cards to be provided to player P1 from a large number of cards. The lottery unit 56 at least temporarily manages the plurality of provided cards it selected by using the provided card management table shown in FIG. 7. As described above, the provided card management table may be accessed by the identification unit 57 when the identification unit 57 applies the second condition as a specific condition.

In step 110, the identification unit 57 identifies specific cards satisfying a specific condition and normal cards not satisfying the specific condition among the provided cards. Next, in step 112, the display control unit 58 generates a web page composed of HTML data (and web programs embedded therein) by using image data corresponding to the specific cards and the normal cards. This web page is sent from the server device 10 to the terminal device 30 of player P1.

Additionally, provided cards (specific cards and normal cards) to be provided to player P1 becomes owned by player P1; and obviously, identification information of these provided cards is managed by the card management table (see FIG. 5) in association with the identification information of player P1.

In step 114, the terminal device 30 displays the specific cards and the normal cards on the display based on the web page received from the server device 10. Following description is based on the case where six cards (with names "soldier A," "soldier C," "wizard E," "playboy F," "dragon G," and "alien B") are selected as provided cards to be provided to player P1, of which three provided cards (with names "soldier C," "playboy F," and "alien B") are selected as specific cards, and the remaining three provided cards (with names "soldier A," "wizard E," and "dragon G") are selected as normal cards.

Figure 10:
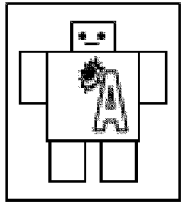
FIG. 10 shows a concrete example of a screen displayed on the terminal device 30 according to an embodiment of the present invention.
Figure 10:
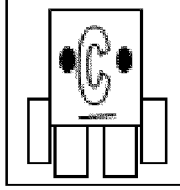
Figure 10:
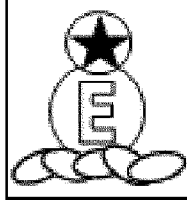
Figure 11:
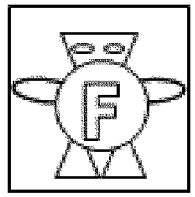
FIG. 11 shows a concrete example of a screen displayed on the terminal device 30 according to an embodiment of the present invention.
Figure 11:
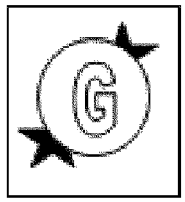
Figure 11:
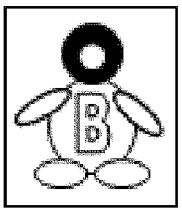

First, as shown in FIGS. 10 and 11, information on the six provided cards is displayed in a continuous arrangement. That is, the displayed information on the six provided cards includes images corresponding to the provided cards and characteristic values assigned to the provided cards. Since one screen cannot simultaneously display information on all of the six provided cards, the screen first only displays information on three provided cards from "soldier A" to "wizard E" as shown in FIG. 10; and when player P1 slides the scroll bar 80 downward, the screen displays information on another three provided cards from "playboy F" to "alien B" as shown in FIG. 11.

As shown in FIGS. 10 and 11, one screen displays information on three provided cards; therefore, the images corresponding to these cards are displayed in a small size. Player P1 viewing such downsized images cannot satisfactorily enjoy the high-definition and lovely images assigned to the provided cards.

Figure 12:
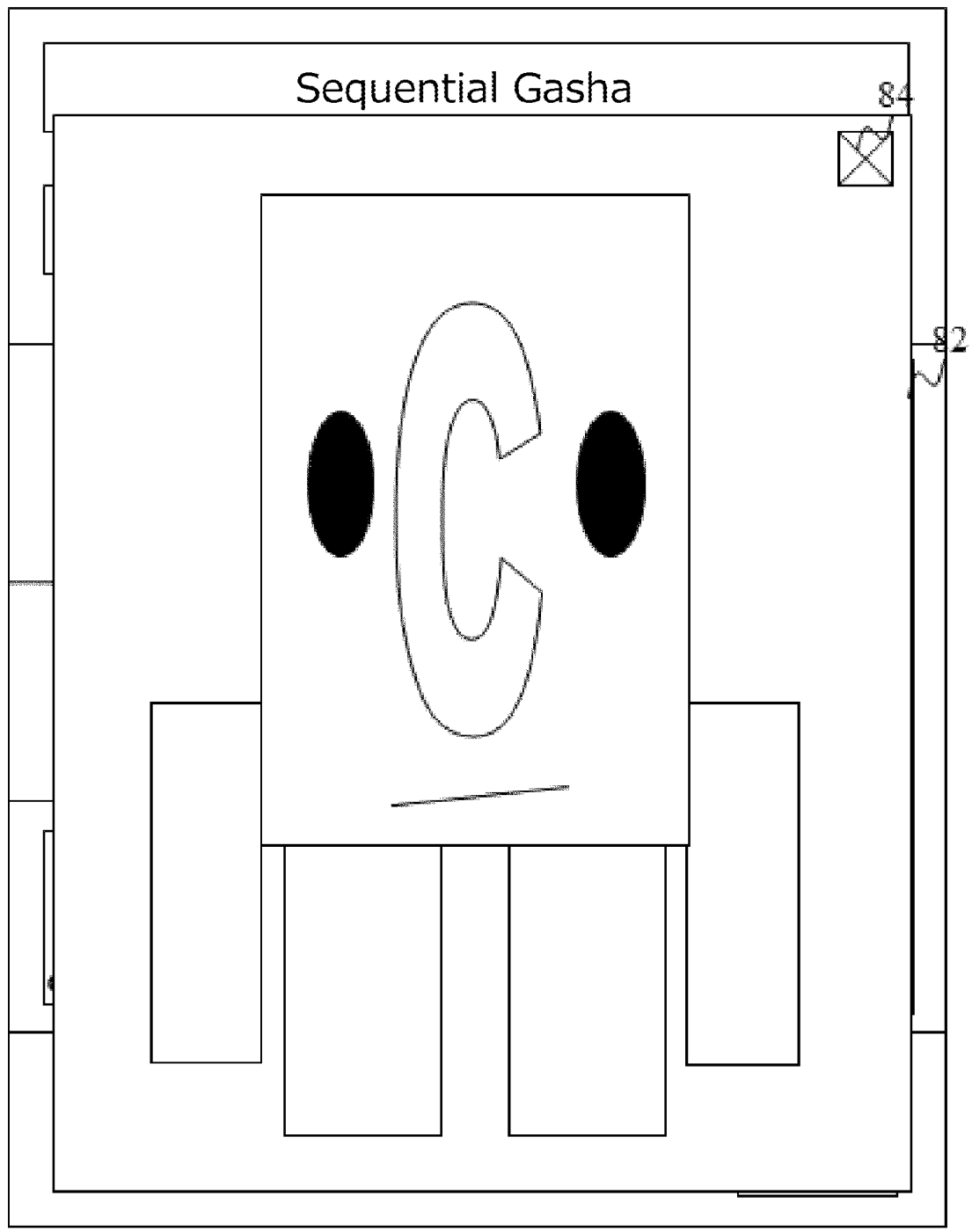
FIG. 12 shows a concrete example of a screen displayed on the terminal device 30 according to an embodiment of the present invention.

Therefore, in this embodiment, a screen containing provided cards continuously arranged as in FIGS. 10 and 11 (hereinafter referred to as "a landing screen" for convenience) is displayed, immediately followed by a screen overlaid on the landing screen, wherein only the specific cards are sequentially displayed in turns within a specific display area. For example, as shown in FIG. 12, an image corresponding to the first specific card (with a name "soldier C") is first displayed, over the landing screen, within a specific display area 82 contained in the display area of the terminal device 30. That is, an image corresponding to the first specific card may pop up over the landing screen. This pop up image may be displayed in a larger size than the images corresponding to the normal cards shown in FIGS. 10 and 11. Thus, player P1 can satisfactorily enjoy the pictorial pattern assigned to the obtained specific card immediately after turning a gasha. The specific cards displayed within a specific display area 82 may be displayed either concurrently with or prior to the landing screen.

Figure 13:
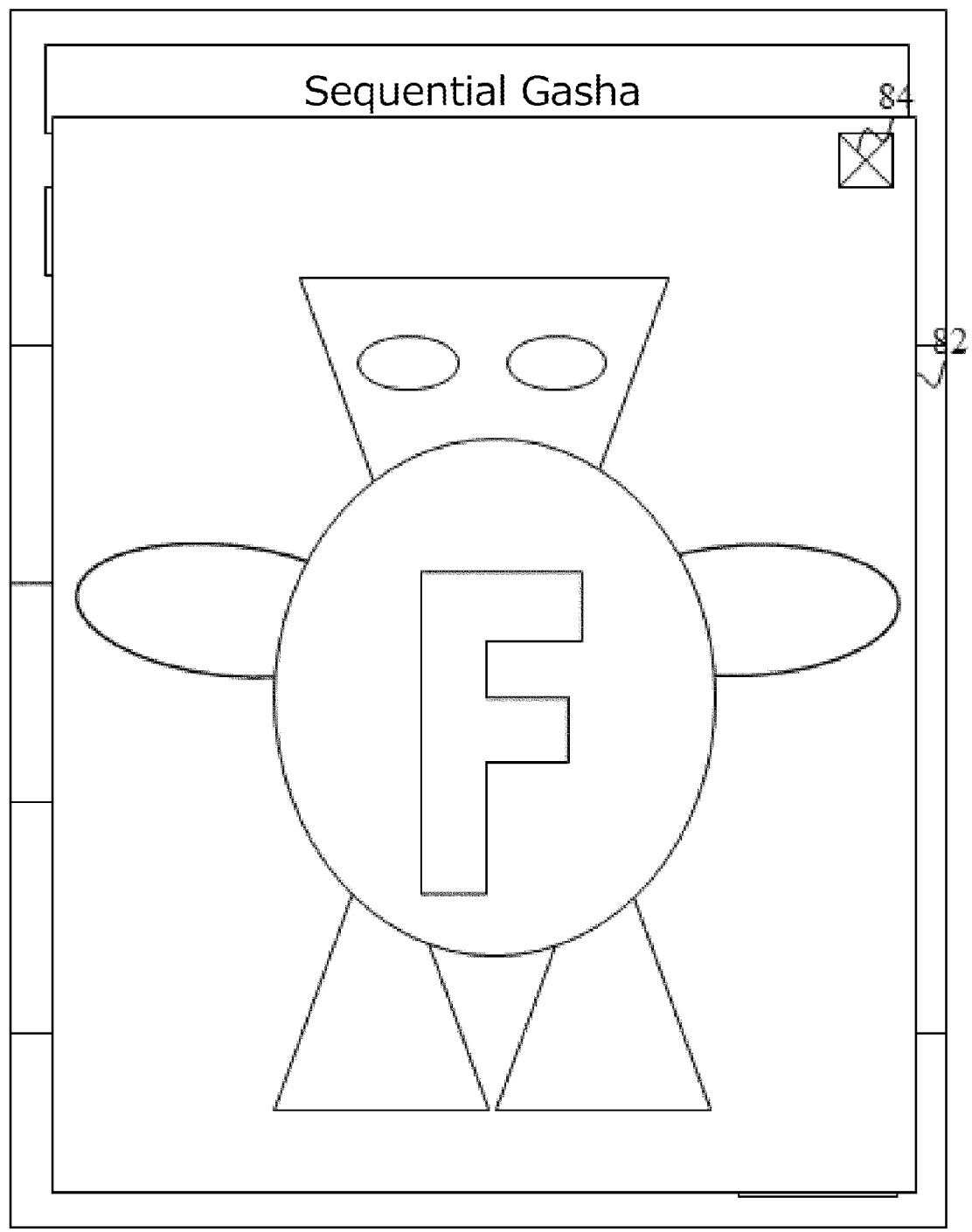
FIG. 13 shows a concrete example of a screen displayed on the terminal device 30 according to an embodiment of the present invention.
Figure 14:
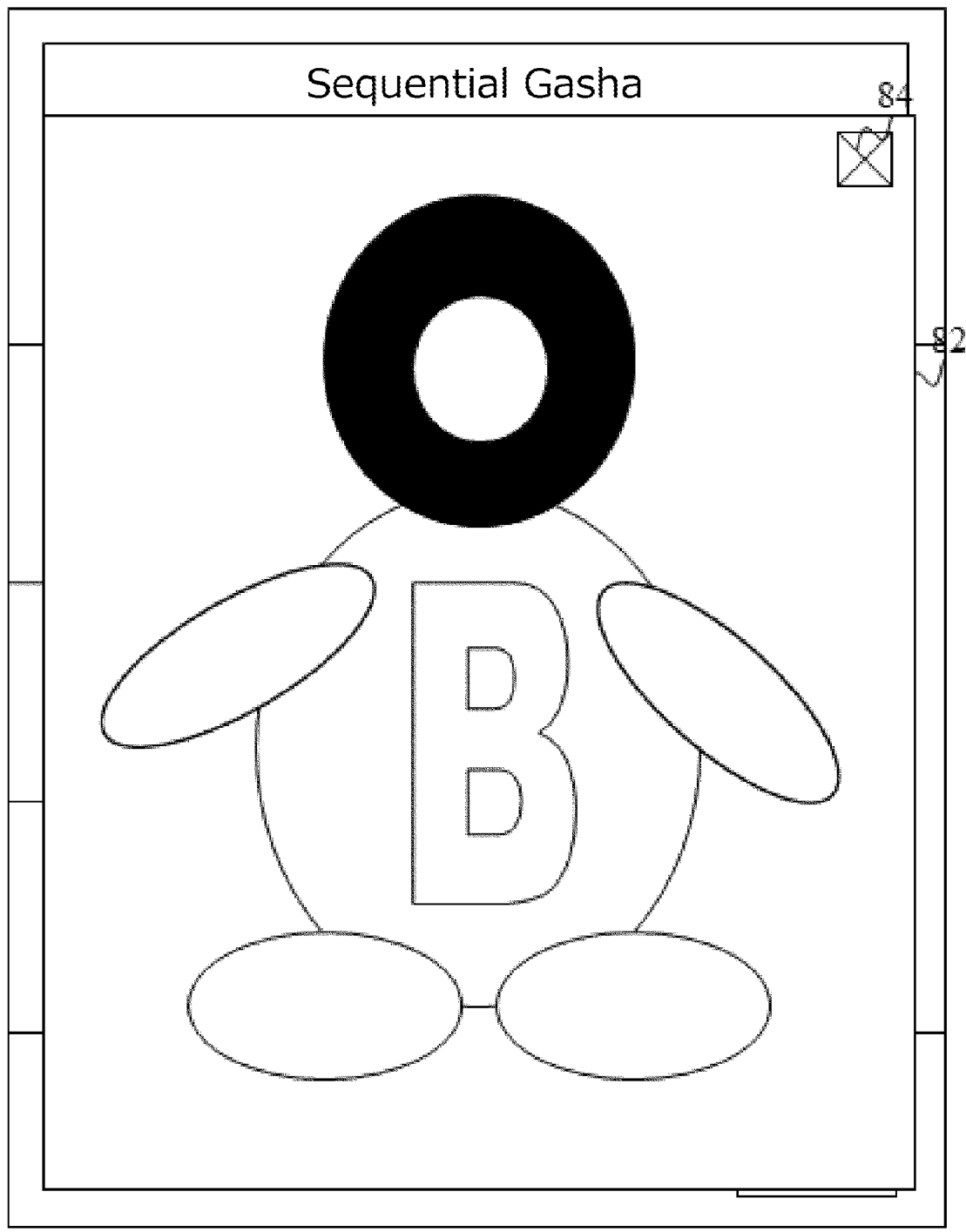
FIG. 14 shows a concrete example of a screen displayed on the terminal device 30 according to an embodiment of the present invention.

When player P1 taps the screen in the state shown in FIG. 12, the first specific card is replaced with an image corresponding to the second specific card (with a name "playboy F") that is displayed in the specific display area 82, as shown in FIG. 13. Further, when player P1 taps the screen in the state shown in FIG. 13, the second specific card is replaced with an image corresponding to the third specific card (with a name "alien B") that is displayed in the specific display area 82, as shown in FIG. 14. Subsequently, when player P1 taps the screen, the image corresponding to the third specific card is disappeared, and the landing screen shown in FIGS. 10 and 11 is displayed again.

Likewise, the displayed image corresponding to a specific card may also be disappeared to display the landing screen again when player P1 taps a close icon 84 in the state where a specific card is displayed in a pop up screen, as shown in FIGS. 12 to 14. Thus, player P1 can terminate the pop up display of images corresponding to specific cards at any time by tapping the close icon 84, causing the landing screen to be displayed. (When player P1 taps a desired specific card in the state where the pop up display of specific cards has been terminated and the landing screen is displayed, the terminal device 30 may display an image corresponding to the tapped specific card in a pop up screen as shown in FIGS. 12 to 14.)

The pop up display of the specific cards shown in FIGS. 12 to 14 may be implemented by, for example, the browser performing a web program (written in, e.g., JavaScript) embedded in the web page for displaying the landing screen when the landing screen shown in FIGS. 10 and 11 is displayed. That is, the images corresponding to the specific cards shown in FIGS. 12 to 14 can be dynamically switched in turns by the browser performing the web program when the landing screen shown in FIGS. 10 and 11 is displayed.

The terminal device 30 may receive images corresponding to these specific cards after receiving the web page for displaying the landing screen from the server device 10 to display the landing screen. In this case, a time lag may occur from the point when the landing screen is displayed to the point when a specific card is displayed (particularly when the communication line connecting the terminal device 30 and the server device 10 is in a poor condition). As a countermeasure, the terminal device 30 may receive image data corresponding to three specific cards in a lump either after, before, or concurrently with receipt of the web page for displaying the landing screen from the server device 10, and store the received image data on a browser cache. Thus, the terminal device 30 can read the image data stored on the browser cache immediately after displaying the landing screen, so as to switchingly display the images corresponding to the three specific cards in turns without a time lag.

FIGS. 12 to 14 show examples wherein the specific display area 82 that displays an image corresponding to a specific card has a size that occupies a most part of the display area of the terminal device 30. However, the specific display area 82 may have a size about 99 to 40%, more preferably about 90 to 70% of the size of the display area of the terminal device 30. Obviously, the specific display area 82 may have substantially the same size as the display area of the terminal device 30.

Figure 15:
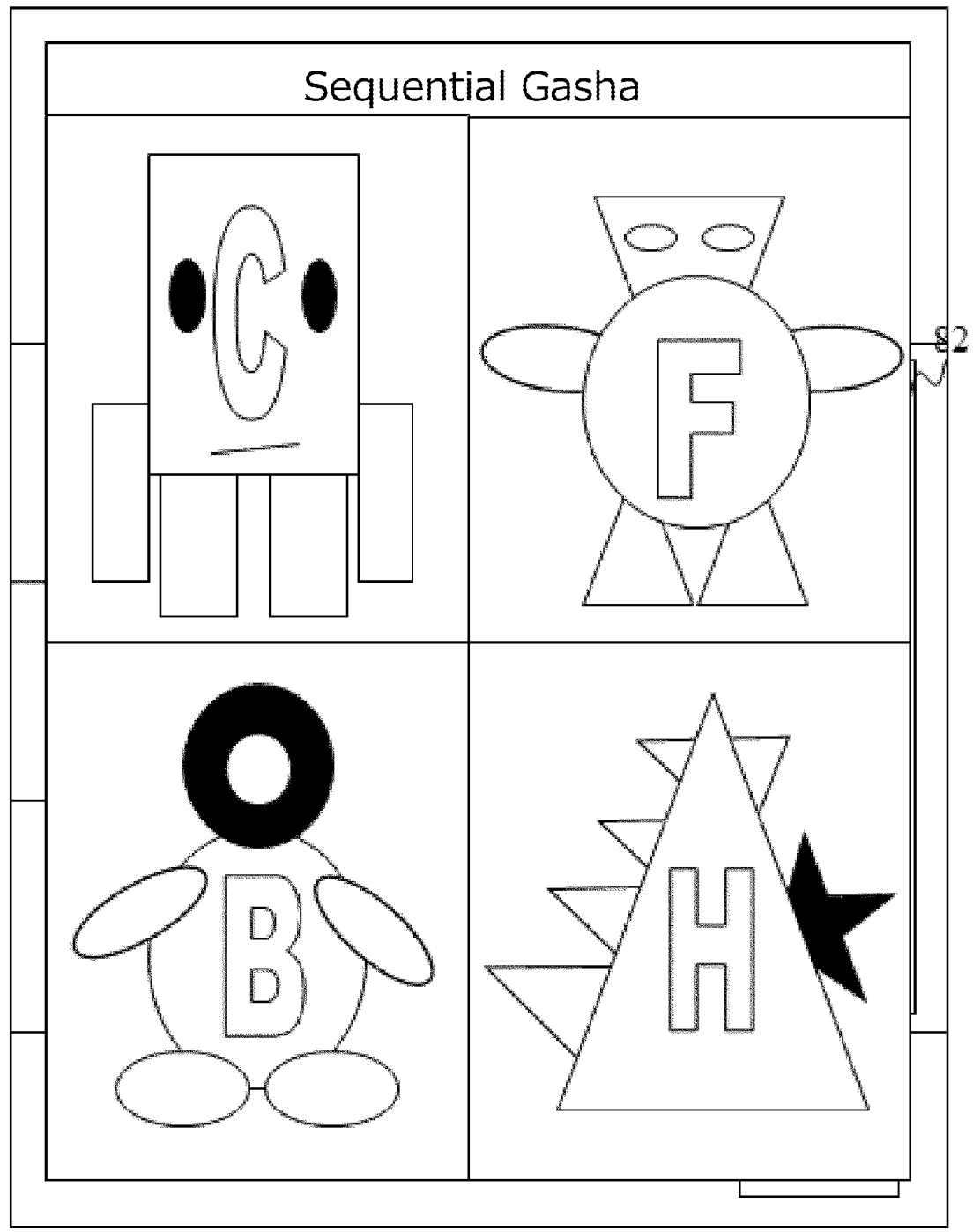
FIG. 15 shows a concrete example of a screen displayed on the terminal device 30 according to an embodiment of the present invention.

Further, FIGS. 12 to 14 show examples wherein one specific display area 82 displays an image corresponding to one specific card at the same time. However, one specific display area 82 may display images corresponding to a plurality of specific images in a lump at the same time. More specifically, as shown in FIG. 15, one specific display area 82 may display, for example, images corresponding to four specific cards in a lump at the same time. According to the embodiment shown in FIG. 15, player P1 can view and enjoy all the pictorial patterns of a large number (e.g., 50) of specific cards more quickly if one specific display area 82 displays images corresponding to four specific cards (in this case, player P1 needs only 13 taps to enjoy all the specific cards) than if one specific display area 82 displays an image corresponding to one specific cards (in this case, player P1 needs 50 taps to enjoy all the specific cards).

In the examples described in connection with FIGS. 12 to 15, an image corresponding to a specific card is displayed in a pop up screen, that is, for example, displayed over the landing screen. However, the screen corresponding to a specific card may not necessarily be displayed in a pop up screen.

Figure 16:
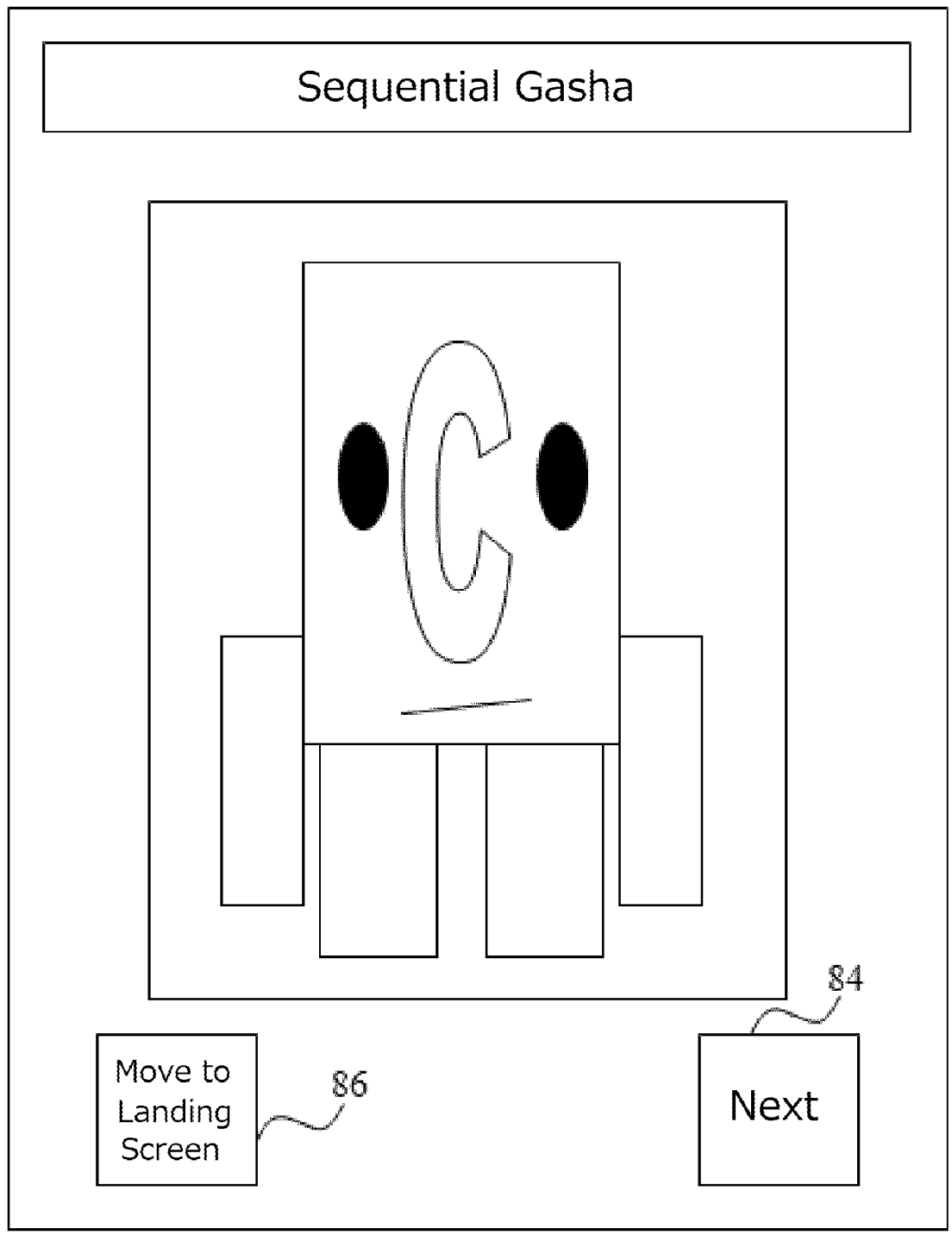
FIG. 16 shows a concrete example of a screen displayed on the terminal device 30 according to an embodiment of the present invention.
Figure 17:
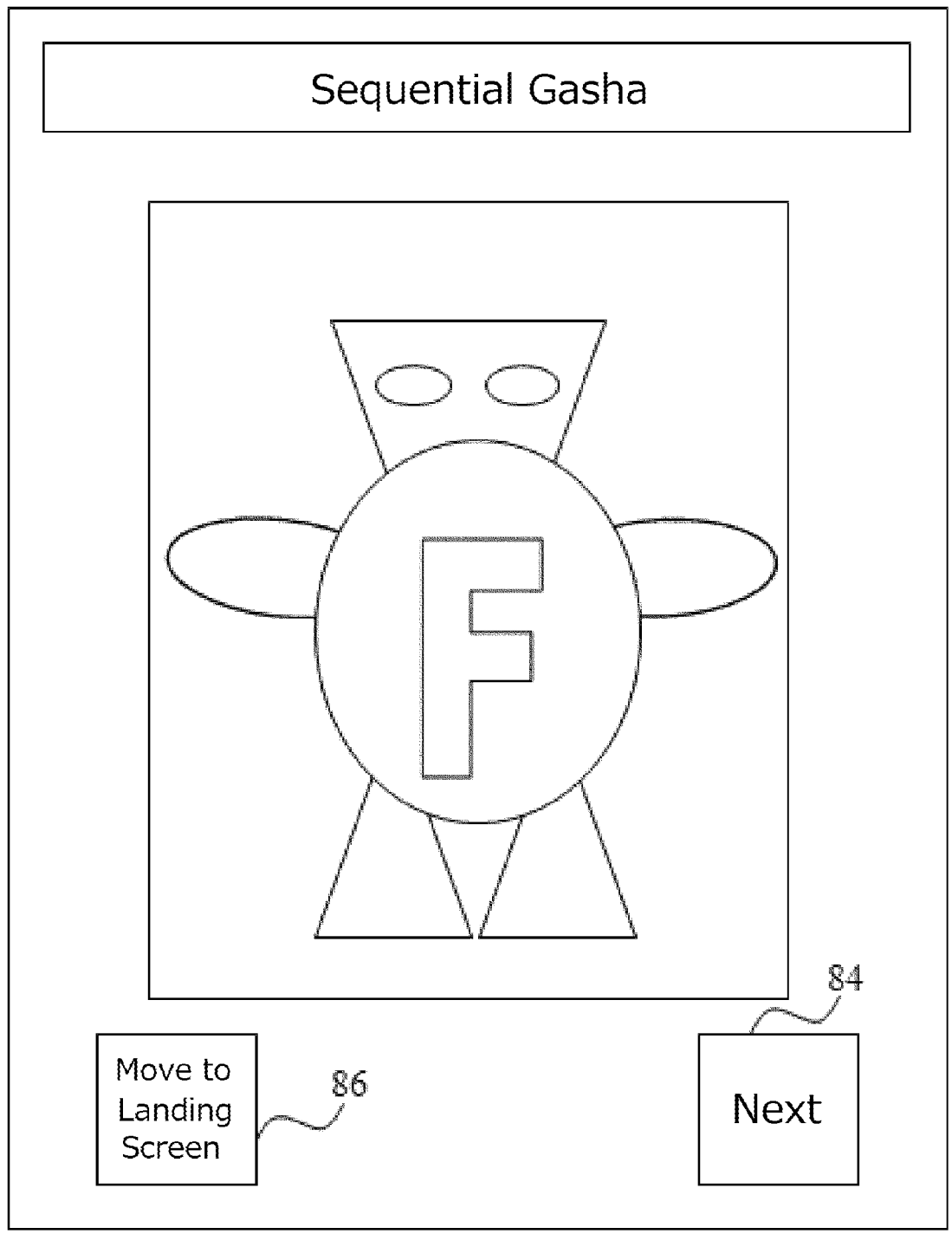
FIG. 17 shows a concrete example of a screen displayed on the terminal device 30 according to an embodiment of the present invention.
Figure 18:
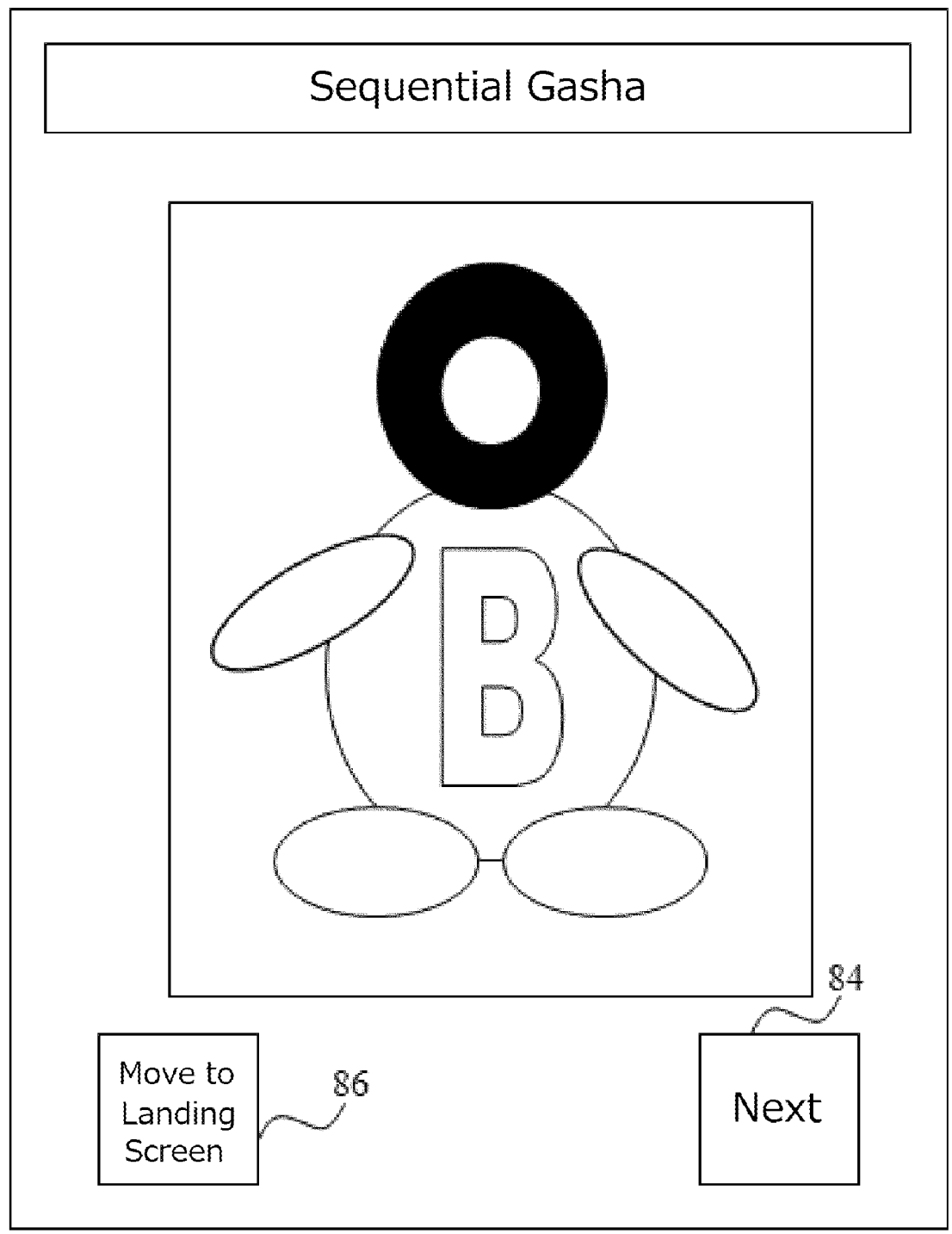
FIG. 18 shows a concrete example of a screen displayed on the terminal device 30 according to an embodiment of the present invention.

More specifically, after reproducing the above mentioned predetermined image, the terminal device 30 may display a web page (corresponding to, e.g., 1.html) associated with an image corresponding to the first specific card as shown in FIG. 16. When player P1 taps the icon 84, the terminal device 30 may display a web page (corresponding to, e.g., 2.html) associated with an image corresponding to the second specific card as shown in FIG. 17. Likewise, when player P1 taps the icon 84, the terminal device 30 may display a web page (corresponding to, e.g., 3.html) associated with an image corresponding to the third specific card as shown in FIG. 18. Further, when player P1 taps the icon 84, the terminal device 30 may display a web page (corresponding to, e.g., list.html) shown in FIGS. 10 and 11. Also, when player P1 taps an icon 86 in the state shown in FIGS. 16 to 18, the terminal device 30 may display the web page shown in FIGS. 10 and 11.

Thus, according to the embodiment, the terminal device may identify cards satisfying a specific condition as specific cards and identify cards not satisfying the specific condition as normal cards, among the plurality of provided cards obtained through a sequential gasha; and the terminal device switchingly displays only the specific cards in turns (in a pop up screen or a large size screen), omitting the normal cards. Thus, the player can satisfactorily enjoy only specific cards that are important to the player among a plurality of provided cards obtained, with reduced labor and time (that is, with reduced labor and time required to view all the provided cards obtained by tapping on one-by-one basis).

Additionally, when the terminal device displays only specific cards in a large size immediately after the player turns a sequential gasha, the player can "immediately" enjoy only provided cards important to the player among those obtained after turning the sequential gasha. Since pictorial patterns of cards used in social games have recently become significantly sophisticated, players are induced to collect such cards. In this respect, the advantage that a player can "immediately" enjoy only provided cards important to the player among provided cards obtained is highly effective to increase the satisfaction of the player with the gasha game according to the embodiment.

Additionally, the terminal device can produce a sense of richness regarding a plurality of cards obtained, by switchingly displaying specific cards in turns in a large size.

Further, when the first condition is applied as a specific condition, the terminal device may switchingly display, in a large size, only provided cards that the player has never obtained before through other games including a gasha game, among provided cards obtained. When the second condition is applied as a specific condition, the terminal device may switchingly display, in a large size, only provided cards having a designated characteristic value, among the provided cards obtained. When the third condition is applied as a specific condition, the terminal device may switchingly display, in a large size, only provided cards that the player has never obtained before through a gasha game, among the provided cards obtained. Thus, the terminal device may change the specific condition to be applied so as to switchingly display, in a large size, only provided cards important to the player (those attracting the player), among the provided cards obtained.

Generally, players want to enjoy the pictorial patterns of cards at the first sight; therefore, the first condition is preferable as a specific condition. Also, cards with a high characteristic value are generally found useful to progress a card game advantageously. Since players want to enjoy such cards, the second condition is also preferable as a specific condition.

The web page (HTML data and a web program embedded therein if necessary) required for the terminal device to display the screens shown in FIGS. 9 to 18 is sent from the server device to the terminal device. Such a web page can be appropriately created by one skilled in the art (a programmer) in accordance with specifications and a layout of the screen to be displayed on the terminal device. The above embodiments are based on a touch panel-type terminal device such as a smart phone. However, it is obvious that the present invention is applicable to button-type terminal devices such as a feature phone. When the terminal device 30 is a button-type terminal device, images displayed in the specific display area 82 may be switched by, for example, the player pressing a predetermined button.

The processes and procedures described and illustrated herein may be implemented by software, hardware, or any combination thereof, as well as that explicitly stated in the embodiments. More specifically, the processes and procedures described and illustrated herein may be implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

If the processes and procedures have been described and illustrated herein to be executed by a single device, software, component, or module, such processes or procedures may also be executed by a plurality of devices, a plurality of pieces of software, a plurality of components, and/or a plurality of modules. The data, table, or database described and illustrated herein to be stored in a single memory may also be distributed to and stored in a plurality of memories included in a single device or a plurality of memories which are located in a plurality of devices in a distributed manner. Furthermore, the software and hardware elements described and illustrated herein may also be integrated into a smaller number of constituent elements or separated into a larger number of constituent elements.

If it is herein described that the invention comprises one element or a plurality of elements, the invention may comprise either one element or a plurality of elements.

What is claimed is:

1. A server device comprising:
   a selection unit configured to randomly select, from game contents, a plurality of provided game contents to be provided to a player;
   an identification unit configured to identify one or more specific game contents satisfying a specific condition and identify one or more normal game contents not satisfying the specific condition, among the plurality of provided game contents selected by the selection unit; and
   a display control unit configured to display, on a terminal device of the player, a second screen at a higher priority than a first screen, the first screen displaying at least some of the plurality of the provided game contents selected by the selection unit in a first size, the so displayed the plurality of the provided game contents including at least the one or more normal game contents identified by the identification unit, and the second screen being different from the first screen and including a specific display area for displaying the one or more specific game contents identified by the identification unit in a second size larger than the first size; and, wherein
   the specific condition is that a provided game content is not owned or has never been owned by the player.

2. The server device of claim 1 wherein the one or more specific game contents are switchingly displayed in turns in the specific display area included in the second screen.

3. The server device of claim 1 wherein the second screen is displayed over the first screen.

4. The server device of claim 1 wherein the second screen is displayed prior to the first screen.

5. The server device of claim 1 wherein the first screen contains the one or more normal game contents and the one or more specific game contents arranged together.

6. A method using a computer comprising the steps of:
   randomly selecting, from game contents, a plurality of provided game contents to be provided to a player;
   identifying one or more specific game contents satisfying a specific condition and identifying one or more normal game contents not satisfying the specific condition, among the plurality of provided game contents; and
   displaying, on a terminal device of the player, a second screen at a higher priority than a first screen, the first screen displaying at least some of the plurality of the provided game contents in a first size, the so displayed the plurality of the provided game contents including at least the one or more normal game contents, and the second screen being different from the first screen and including a specific display area for displaying the one or more specific game contents in a second size larger than the first size; and, wherein
   the specific condition is that a provided game content is not owned or has never been owned by the player.

* * * * *